(12) United States Patent
Bradenburg (10) Patent No.: US 10,967,614 B2
(45) Date of Patent: Apr. 6, 2021

(54) SOLID-PHASE COMPOSITE STRUCTURE AND RELATED METHODS

(71) Applicant: Seaman Corporation, Wooster, OH (US)

(72) Inventor: Frank E. Bradenburg, Wooster, OH (US)

(73) Assignee: SEAMEN CORPORATION, Wooster, OH (US)

(*) Notice: Subject to any disclaimer, the term of this patent is extended or adjusted under 35 U.S.C. 154(b) by 432 days.

(21) Appl. No.: 15/956,842

(22) Filed: Apr. 19, 2018

(65) Prior Publication Data

US 2018/0304597 A1 Oct. 25, 2018

Related U.S. Application Data

(60) Provisional application No. 62/487,663, filed on Apr. 20, 2017.

(51) Int. Cl.
*B32B 27/08* (2006.01)
*B62B 5/02* (2006.01)
(Continued)

(52) U.S. Cl.
CPC .............. *B32B 27/08* (2013.01); *B32B 5/022* (2013.01); *B32B 5/024* (2013.01); *B32B 7/12* (2013.01);
(Continued)

(58) Field of Classification Search
CPC ............. Y10T 442/671; Y10T 442/676; B32B 2250/04; B32B 2250/05; B32B 2260/044; B32B 2315/06; B32B 5/022; B32B 7/04; B32B 27/08; B32B 27/304; B32B 2309/105; B32B 2260/021; B32B 2315/16; B32B 5/034; B32B 5/028; B32B 5/26; B32B 7/08; B32B 7/02; B32B 7/12; B32B 27/12; B32B 27/32; B32B 27/36; B32B 2305/08; B32B 2307/402; B32B 2307/50;
(Continued)

(56) References Cited

U.S. PATENT DOCUMENTS 5,318,832 A * 6/1994 Fishel ...................... B32B 5/26
442/392

* cited by examiner

*Primary Examiner* — Camie S Thompson
(74) *Attorney, Agent, or Firm* — Schlue IP Law; Daniel J. Schlue (57) ABSTRACT

A composite structure having a solid-phase concrete base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase concrete base-substrate component; a substantially planar component having first and second sides, wherein the substantially planar-component first side is attached to the mesh-component second side; and an adhesive-layer component having a first and second surface, wherein the adhesive-layer component first surface is in contact with and attached to the second side of the substantially planar component, and wherein the adhesive-layer second surface is in contact with and attached to a first surface of a polyvinylchloride or polyvinylchloride-containing exterior sheet.

12 Claims, 8 Drawing Sheets

(51) Int. Cl.
  *B32B 7/12* (2006.01)
  *B32B 13/02* (2006.01)
  *B32B 27/30* (2006.01)
  *B32B 27/36* (2006.01)
  *C04B 16/06* (2006.01)
  *B32B 5/02* (2006.01)

(52) U.S. Cl.
  CPC ............ *B32B 13/02* (2013.01); *B32B 27/304* (2013.01); *B32B 27/36* (2013.01); *C04B 16/0633* (2013.01); *B32B 2250/04* (2013.01); *B32B 2250/05* (2013.01); *B32B 2260/021* (2013.01); *B32B 2260/044* (2013.01); *B32B 2262/101* (2013.01); *B32B 2305/08* (2013.01); *B32B 2307/402* (2013.01); *B32B 2307/50* (2013.01); *B32B 2315/06* (2013.01)

(58) Field of Classification Search
  CPC ...... B32B 2307/714; B32B 2307/7265; B32B 2307/732; B32B 2307/734; B32B 2270/00; B32B 2262/0276; B32B 2262/10; B32B 2262/101; B32B 2262/14; B32B 13/02; B32B 13/14; B32B 19/04; B32B 19/045; C04B 16/0633
  USPC .......... 156/71; 442/392, 396, 50; 428/294.7, 428/297.4
  See application file for complete search history.

SOLID-PHASE COMPOSITE STRUCTURE AND RELATED METHODS

CROSS-REFERENCE TO RELATED APPLICATIONS

This patent application claims priority to U.S. provisional patent application Ser. No. 62/487,663 filed on Apr. 20, 2017. All of the subject matter in U.S. provisional patent application Ser. No. 62/487,663 is hereby incorporated by reference.

BACKGROUND OF THE INVENTION

Waterproofing technologies for solid-phase concrete are known and include post treatment of a solid-phase concrete surface with at least a liquid-applied coating or paint. A need remains for additional concrete solid-phase substrate waterproofing technologies.

BRIEF SUMMARY OF THE INVENTION

A composite structure having a solid-phase concrete base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase concrete base-substrate component; a substantially planar component having first and second sides, wherein the substantially planar-component first side is attached to the mesh-component second side; and an adhesive-layer component having a first and second surface, wherein the adhesive-layer component first surface is in contact with and attached to the second side of the substantially planar component, and wherein the adhesive-layer second surface is in contact with and attached to a first surface of a polyvinylchloride or polyvinylchloride-containing exterior sheet.

A composite structure having a solid-phase base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component; a substantially planar component having first and second sides, wherein the substantially planar-component first side is attached to the mesh-component second side; and an adhesive-layer component having a first and second surface, wherein the adhesive-layer component first surface is in contact with and attached to the second side of the substantially planar component, and wherein the adhesive-layer second surface is in contact with and attached to a first surface of an exterior sheet.

A method having the step: placing into contact with and thereby covering at least a portion of a composite structure's mesh component with a liquid-phase base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; and an adhesive-layer component having a first and second surface, wherein the adhesive-layer component first surface is in contact with and attached to the substantially planar component's second side, and wherein the adhesive-layer second surface is in contact with and attached to a first surface of an exterior sheet.

A method having the step: placing into contact with and thereby covering at least a portion of a composite structure's mesh component with a non-cured base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; and an adhesive-layer component having a first and second surface, wherein the adhesive-layer component first surface is in contact with and attached to the substantially planar component's second side, and wherein the adhesive-layer second surface is in contact with and attached to a first surface of an exterior sheet.

A composite structure having a solid-phase concrete base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase concrete base-substrate component; a substantially planar component having first and second sides, wherein the substantially planar-component first side is attached to the mesh-component second side; and a polyvinylchloride or polyvinylchloride-containing exterior sheet that is attached to the second side of the substantially planar component.

A composite structure having a solid-phase base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component; a substantially planar component having first and second sides, wherein the substantially planar-component first side is attached to the mesh-component second side; and an exterior sheet that is attached to the second side of the substantially planar component.

A method having the step: placing into contact with and thereby covering at least a portion of a composite structure's mesh component with a liquid-phase base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side, and an exterior sheet that is attached to the second side of the substantially planar component.

A method having the step: placing into contact with and thereby covering at least a portion of a composite structure's mesh component with a non-cured base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side, and an exterior sheet that is attached to the second side of the substantially planar component.

A composite structure having a solid-phase concrete base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase concrete base-substrate component; a substantially planar component having first and second sides, wherein the substantially planar-component first side is attached to the mesh-component second side; an adhesive-layer component having a first and second surface, wherein the adhesive-layer component first surface is in contact with and attached to the second side of the substantially planar component, and wherein the adhesive-layer second surface is in contact with and attached to a first surface of a polyvinylchloride or polyvinylchloride-containing interior sheet; and a polyester reinforcing component having a first and second surface, wherein the polyester reinforcing component first surface is in contact with and attached to a second surface of the polyvinylchloride or polyvinylchloride-containing interior sheet, and wherein the polyester reinforcing component second surface is in contact with and attached to a first surface of a polyvinylchloride or polyvinylchloride-containing exterior sheet.

A composite structure having a solid-phase base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component; a substantially planar component having first and second sides, wherein the substantially planar-component first side is attached to the mesh-component second side; an adhesive-layer component having a first and second surface, wherein the adhesive-layer component first surface is in contact with and attached to the second side of the substantially planar component, and wherein the adhesive-layer second surface is in contact with and attached to a first surface of an interior sheet; and a reinforcing component having a first and second surface wherein the reinforcing component first surface is in contact with and attached to a second surface of the interior sheet, and wherein the reinforcing component second surface is in contact with and attached to a first surface of an exterior sheet.

A method having the step: placing into contact with and thereby covering at least a portion of a composite structure's mesh component with a liquid-phase base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; an adhesive-layer component having a first and second surface, wherein the adhesive-layer component first surface is in contact with and attached to the second side of the substantially planar component, and wherein the adhesive-layer second surface is in contact with and attached to a first surface of an interior sheet; and a reinforcing component having a first and second surface wherein the reinforcing component first surface is in contact with and attached to a second surface of the interior sheet, and wherein the reinforcing component second surface is in contact with and attached to a first surface of an exterior sheet.

A method having the step: placing into contact with and thereby covering at least a portion of a composite structure's mesh component with a non-cured base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; an adhesive-layer component having a first and second surface, wherein the adhesive-layer component first surface is in contact with and attached to the second side of the substantially planar component, and wherein the adhesive-layer second surface is in contact with and attached to a first surface of an interior sheet; and a reinforcing component having a first and second surface wherein the reinforcing component first surface is in contact with and attached to a second surface of the interior sheet, and wherein the reinforcing component second surface is in contact with and attached to a first surface of an exterior sheet.

A composite structure having a solid-phase concrete base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase concrete base-substrate component; a substantially planar component having first and second sides, wherein the substantially planar-component first side is attached to the mesh-component second side; a first adhesive-layer component having a first and second surface, wherein the first adhesive-layer component first surface is in contact with and attached to the second side of the substantially planar component, and wherein the first adhesive-layer component second surface is in contact with and attached to a first surface of an interior sheet; and a reinforcing component having a first and second surface wherein the reinforcing component first surface is adhered to a second surface of the interior sheet, and wherein the reinforcing component second surface is adhered to a first surface of an exterior sheet.

A composite structure having a solid-phase base-substrate component; a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component; a substantially planar component having first and second sides, wherein the substantially planar-component first side is attached to the mesh-component second side; a first adhesive-layer component having a first and second surface, wherein the first adhesive-layer component first surface is in contact with and attached to the second side of the substantially planar component, and wherein the first adhesive-layer component second surface is in contact with and attached to a first surface of an interior sheet; and a reinforcing component having a first and second surface wherein the reinforcing component first surface is adhered to a second surface of the interior sheet, and wherein the reinforcing component second surface is adhered to a first surface of an exterior sheet.

A method having the step: placing into contact with and thereby covering at least a portion of a composite structure's mesh component with a liquid-phase base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; a first adhesive-layer component having a first and second surface, wherein the first adhesive-layer component first surface is in contact with and attached to the second side of the substantially planar component, and wherein the first adhesive-layer component second surface is in contact with and attached to a first surface of an interior sheet; and a reinforcing component having a first and second surface wherein the reinforcing component first surface is adhered to a second surface of the interior sheet, and wherein the reinforcing component second surface is adhered to a first surface of an exterior sheet.

A method having the step: placing into contact with and thereby covering at least a portion of a composite structure's mesh component with a non-cured base substrate component, wherein the composite structure has: a mesh component having non-woven solid-phase polymeric strands that are fused together to form a three-dimensional structure having a thickness of at least three millimeters, the thickness being defined as the greatest normal distance between the mesh-component first side and second opposing side; a substantially planar component having first and second sides, wherein the substantially planar-component first side is attached to the mesh-component second side; a first adhesive-layer component having a first and second surface, wherein the first adhesive-layer component first surface is in contact with and attached to the second side of the substantially planar component, and wherein the first adhesive-layer component second surface is in contact with and attached to a first surface of an interior sheet; and a reinforcing component having a first and second surface wherein the reinforcing component first surface is adhered to a second surface of the interior sheet, and wherein the reinforcing component second surface is adhered to a first surface of an exterior sheet.

DETAILED DESCRIPTION OF THE INVENTION

Figure 1:
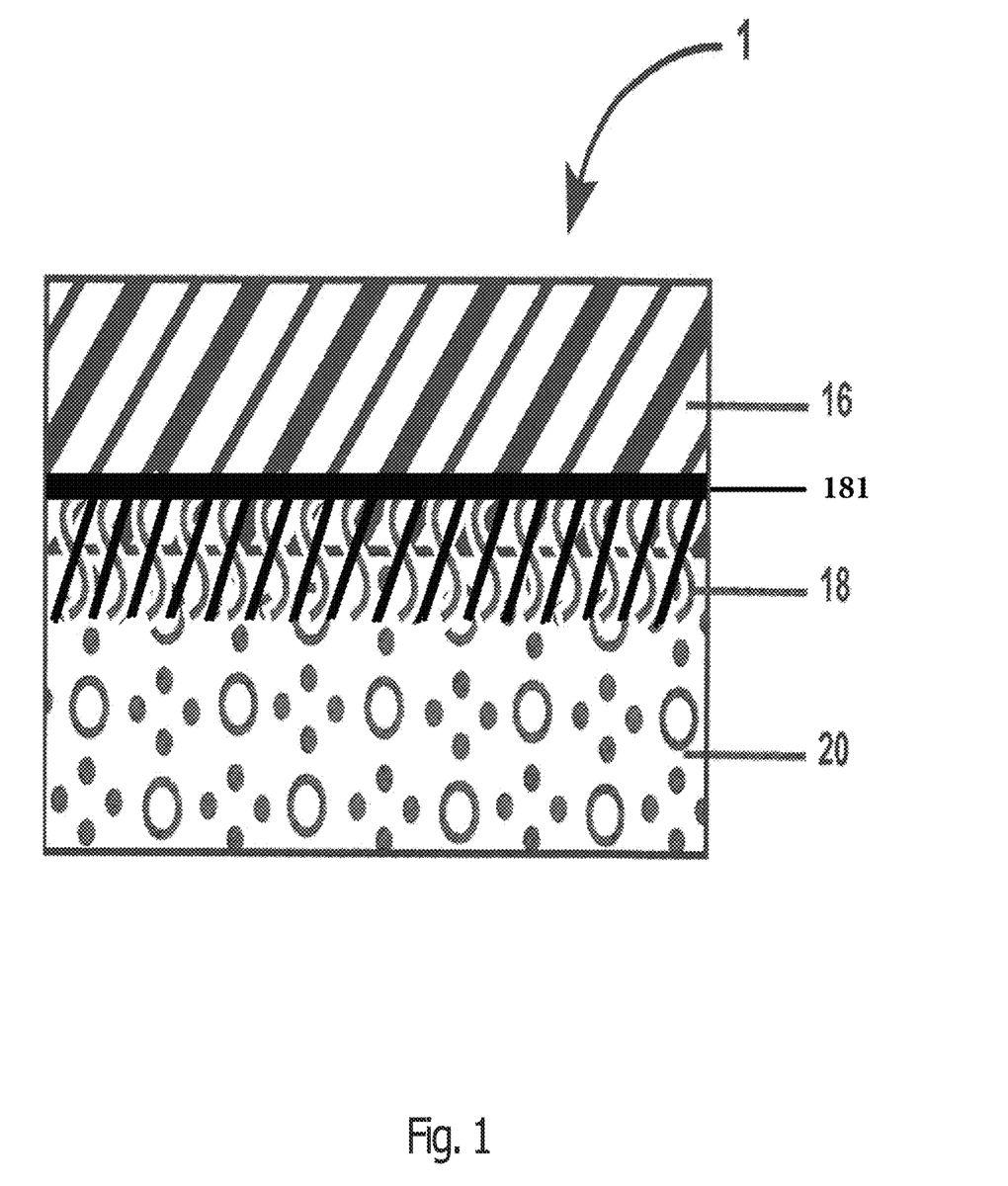
FIG. 1 is a schematic showing a solid-phase composite-structure embodiment.
Figure 2:
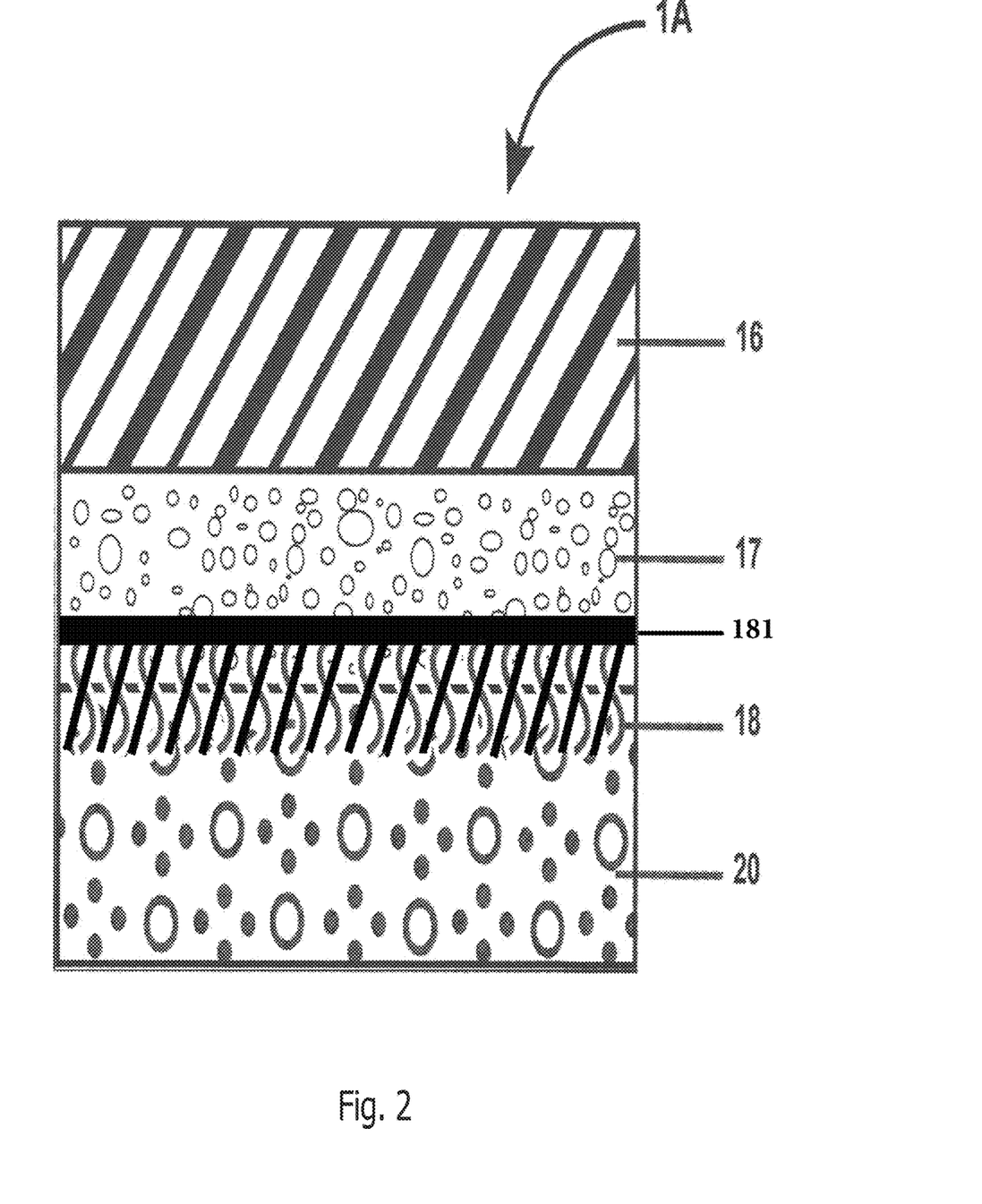
FIG. 2 is a schematic showing a solid-phase composite-structure embodiment.

With reference to FIGS. 1 and 2, respectively provided are solid-phase composite-structure embodiments 1 and 1A. FIG. 1 is a schematic that shows solid-phase composite structure 1 having solid-phase base-substrate component 20, mesh component 18, substantially planar component 181, and exterior-sheet component 16. FIG. 2 is a schematic that shows solid-phase composite structure 1A having solid-phase base-substrate component 20, mesh component 18, substantially planar component 181, adhesive-layer component 17, and exterior-sheet component 16.

Figure 3:
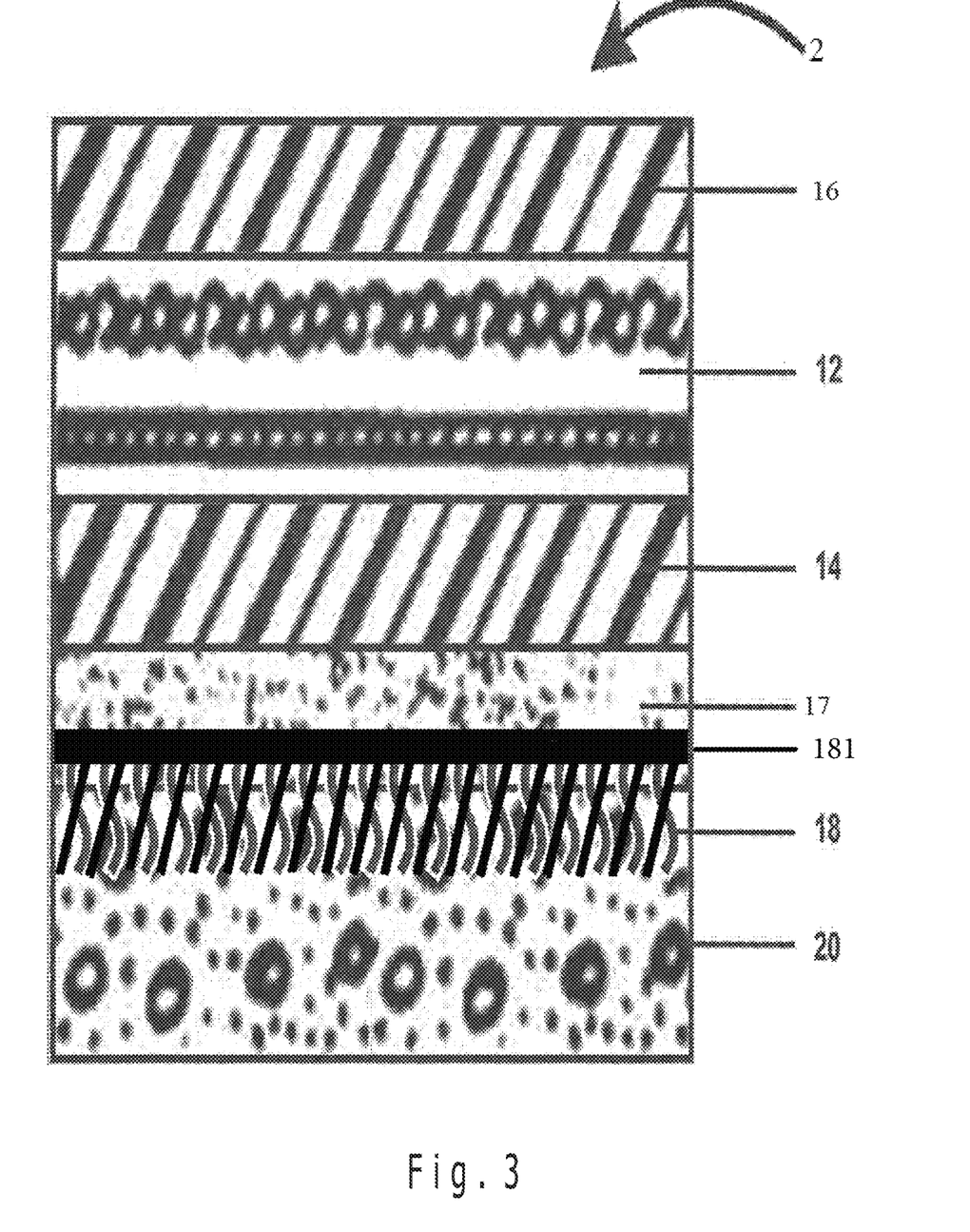
FIG. 3 is a schematic showing a solid-phase composite-structure embodiment.
Figure 4:
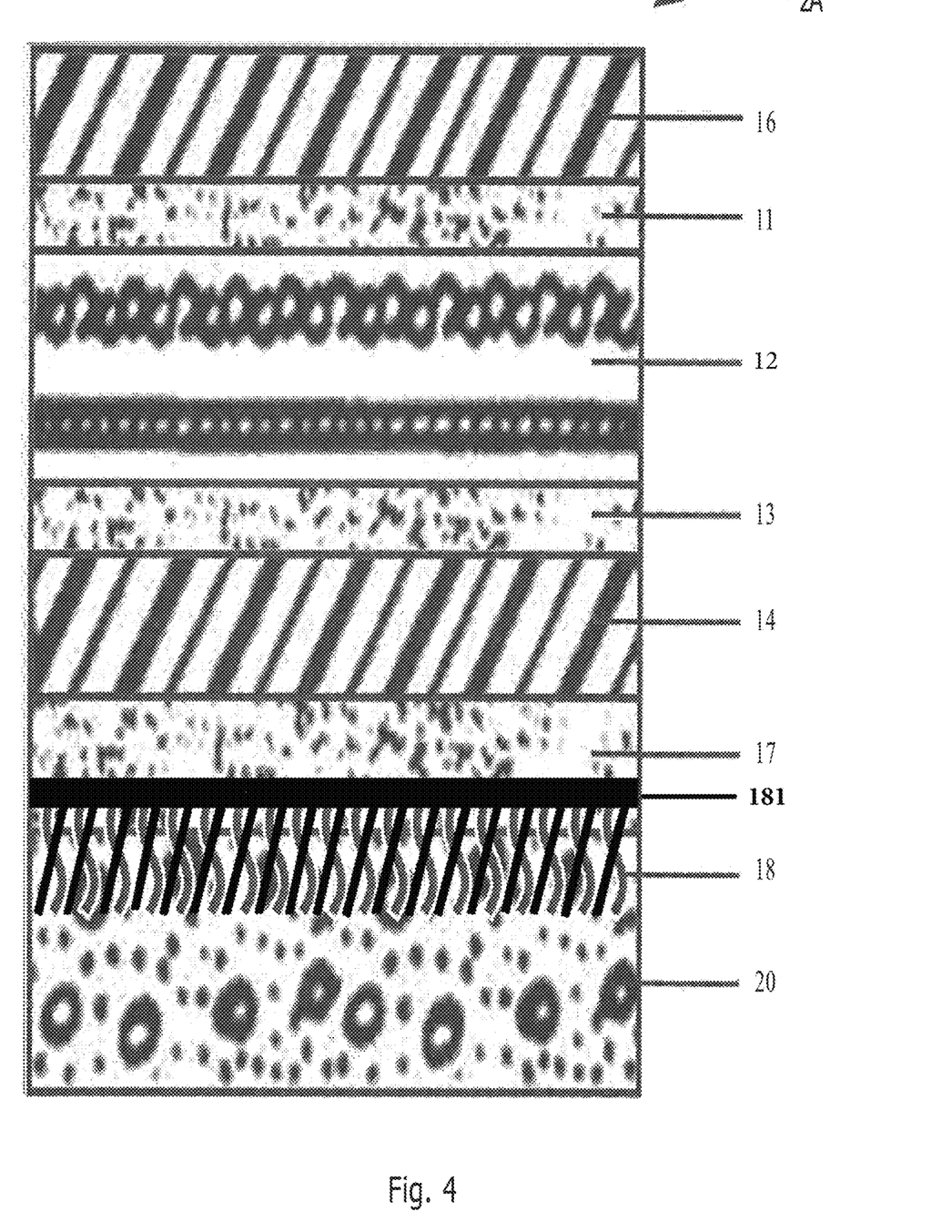
FIG. 4 is a schematic showing a solid-phase composite-structure embodiment.
Figure 5A:
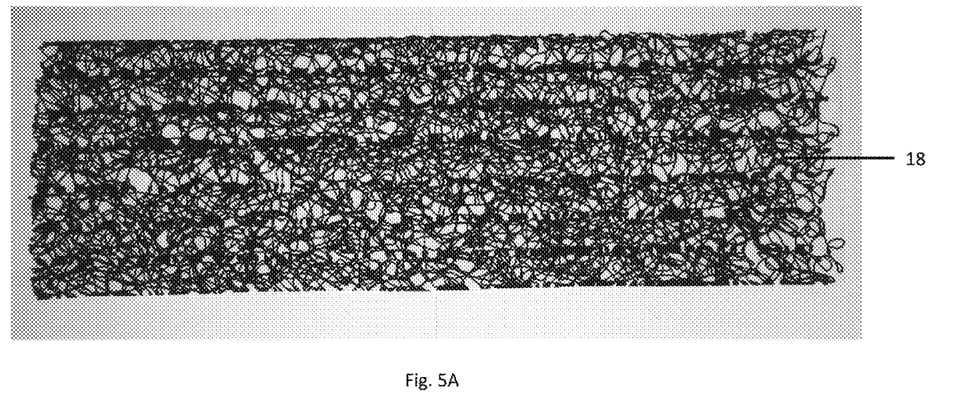
FIG. 5A is a top-view photograph of a commercially available composite material that consists of mesh component 18 fixedly attached to substantially planar component 181.
Figure 5B:
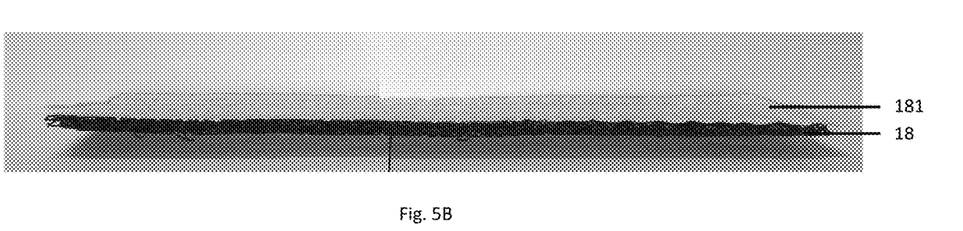
FIG. 5B is a side-view photograph of a commercially available composite material that consists of mesh component 18 fixedly attached to substantially planar component 181.
Figure 6A:
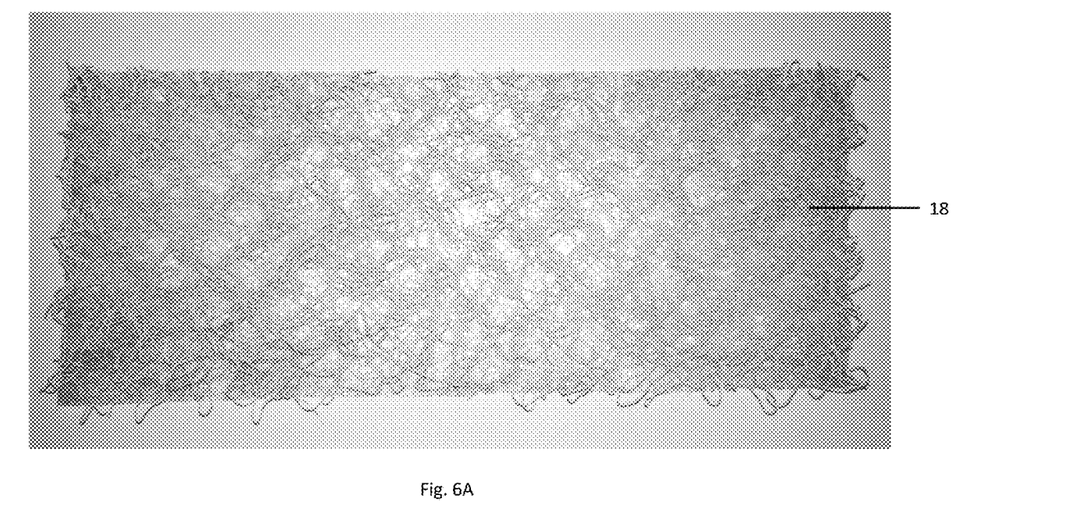
FIG. 6A is a top-view photograph of a commercially available composite material that consists of mesh component 18 fixedly attached to substantially planar component 181.
Figure 6B:
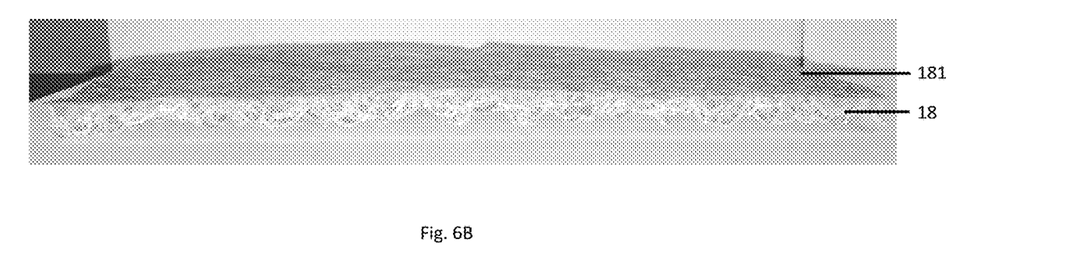
FIG. 6B is a side-view photograph of a commercially available composite material that consists of mesh component 18 fixedly attached to substantially planar component 181.
Figure 7A:
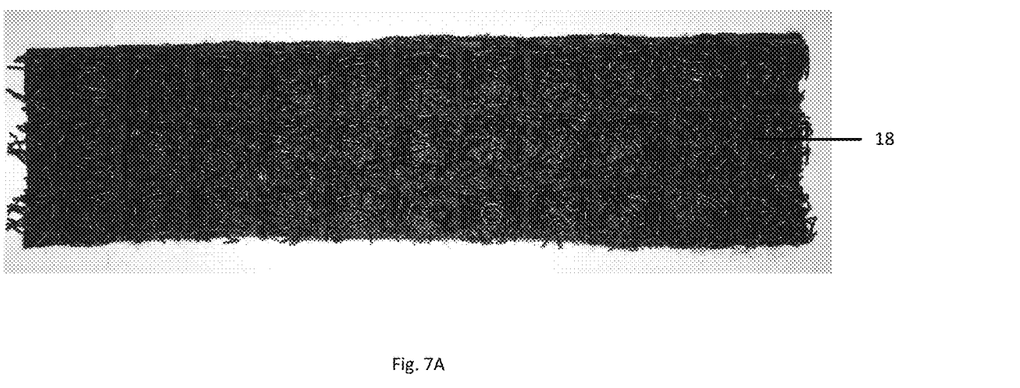
FIG. 7A is a top-view photograph of a commercially available composite material that consists of mesh component 18 fixedly attached to substantially planar component 181.
Figure 7B:
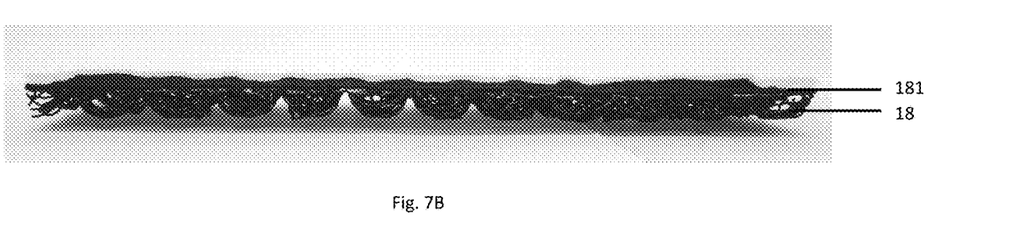
FIG. 7B is a side-view photograph of a commercially available composite material that consists of mesh component 18 fixedly attached to substantially planar component 181.
Figure 8A:
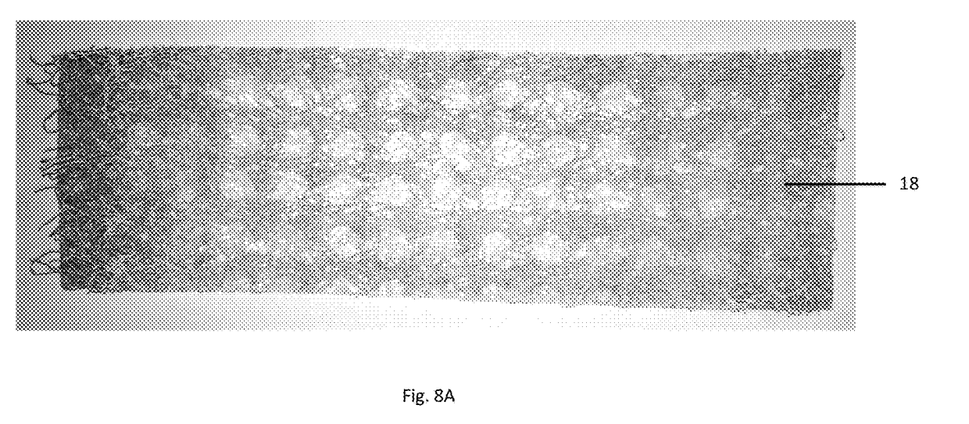
FIG. 8A is a top-view photograph of a commercially available composite material that consists of mesh component 18 fixedly attached to substantially planar component 181.
Figure 8B:
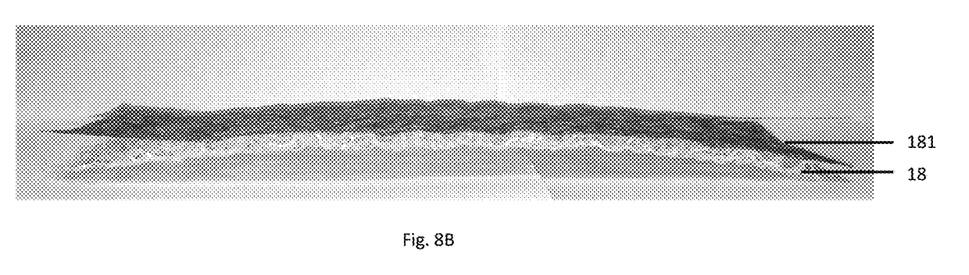
FIG. 8B is a side-view photograph of a commercially available composite material that consists of mesh component 18 fixedly attached to substantially planar component 181.

With reference to FIGS. 3 and 4, respectively provided are solid-phase composite-structure embodiments 2 and 2A.

FIG. 3 is a schematic that shows solid-phase composite structure 2 having solid-phase base-substrate component 20, mesh component 18, substantially planar component 181, adhesive-layer component 17, interior-sheet component 14, reinforcing component 12, and exterior-sheet component 16. FIG. 4 is a schematic that shows solid-phase composite structure 2A having solid-phase base-substrate component 20, mesh component 18, substantially planar component 181, adhesive-layer component 17, interior-sheet component 14, adhesive-layer component 13, reinforcing component 12, adhesive-layer component 11, and exterior-sheet component 16.

In a first embodiment, and as shown in FIG. 1, mesh component 18 is a plurality of non-woven rigid strands embedded into and mechanically attached to solid-phase base-substrate component 20, mesh component 18 is also attached to substantially planar component 181, and substantially planar component 181 is attached to exterior-sheet component 16.

In a second embodiment, and as shown in FIG. 2, mesh component 18 is a plurality of non-woven rigid strands embedded into and mechanically attached to solid-phase base-substrate component 20, mesh component 18 is also attached to substantially planar component 181, substantially planar component 181 is adhered to adhesive-layer component 17, and adhesive-layer component is adhered to exterior-sheet component 16.

In a third embodiment, and as shown in FIG. 3, mesh component 18 is a plurality of non-woven rigid strands embedded into and mechanically attached to solid-phase base-substrate component 20, mesh component 18 is also attached to substantially planar component 181, substantially planar component 181 is adhered to adhesive-layer component 17, and adhesive-layer component 17 is adhered to interior-sheet component 14, interior-sheet component 14 is attached to reinforcing component 12, and reinforcing component 12 is attached to exterior-sheet component 16.

In a fourth embodiment, and as shown in FIG. 4, mesh component 18 is a plurality of non-woven rigid strands embedded into and mechanically attached to solid-phase base-substrate component 20, mesh component 18 is also attached to substantially planar component 181, substantially planar component 181 is adhered to adhesive-layer component 17, and adhesive-layer component 17 is adhered to interior-sheet component 14, interior-sheet component 14 is adhered to adhesive-layer component 13, adhesive-layer component 13 is adhered to reinforcing component 12, reinforcing component 12 is adhered to adhesive-layer component 11, and adhesive-layer component 11 is adhered to exterior-sheet component 16.

With reference to FIGS. 1-4, embodiments are generally directed to pre-cast or cast-in-place solid-phase composite structures having components directly or indirectly mechanically attached to at least one side or surface of solid-phase base-substrate component 20 via mesh component 18 that is at least partially embedded into the fixed matrix of solid-phase base-substrate component 20. The above-mentioned terms "pre-cast" and "cast-in-place" generally describe when and where the solid-phase composite structure is manufactured. "Pre-cast" solid-phase composite structures 1 and 1A are prefabricated at a first manufacturing location and then subsequently shipped to a second location for use. On the other hand, "cast-in-place" solid-phase composite structures are manufactured in the field and on location; in other words, they are not prefabricated. "Direct mechanical attachment" is a term that describes first and second solid-phase composite-structure components that are immediately adjacent to each other and also mechanically or adhesively attached to one another. "Indirect mechanical attachment," is a term that describes first and second solid-phase composite-structure components that are separated by at least one in-between or intermediate component that serves to attach the first and second components to one another.

Additional embodiments are directed to pre-cast or cast-in-place solid-phase composite structures having components directly or indirectly mechanically attached to at least two sides or surfaces of solid-phase base-substrate component 20 via at least one respective mesh component 18 that is at least partially embedded therein. Other embodiments are directed to solid-phase composite structures 1 and 1A being pre-cast or cast-in-place concrete-based composite structures having non-concrete components directly or indirectly mechanically attached to at least one side or surface of concrete base-substrate component 20 via at least one respective mesh component 18 that is at least partially embedded therein. Additional solid-phase composite-structure 1 and 1A embodiments are directed to pre-cast or cast-in-place concrete-based composite structures having non-concrete components directly or indirectly mechanically attached to at least two sides or surfaces of concrete base-substrate component 20 via mesh component 18 that is at least partially embedded into the at least two sides or surfaces of the fixed matrix of base-substrate component 20.

Components

Solid-phase base-substrate component 20 is the substrate upon which all other components are directly or indirectly attached, and in embodiments, solid-phase base-substrate component 20 provides much of the strength and structural integrity to solid-phase composite-structure embodiments. As a non-limiting example of a useful application for solid-phase composite-structure embodiments, solid-phase composite structures serve to provide the structural support that is commonly provided by a known poured-concrete home foundation or any other known solid-phase concrete structures that commonly need exterior-surface waterproofing. A person of ordinary skill in the art will be able to select additional useful solid-phase composite structure applications without having to exercise undue experimentation. Useful solid-phase base-substrate component 20 materials include solid-phase concrete, solid-phase concrete-containing materials, solid-phase cement-containing materials, solid-phase materials having a fixed matrix, and combinations thereof. Liquid-phase concrete and non-cured dry-cast concrete are useful during manufacturing.

As shown in FIGS. 5-8, mesh component 18 can be understood to be a three-dimensional rigid-mesh component having an open structure that is created by rigid polymeric strands. Any number of three-dimensional rigid-mesh shapes and structures can be employed as mesh component 18. In manufacturing mesh component 18, useful fibrous-component materials include non-polymeric strands, polymeric strands, polypropylene strands, nylon strands, fiberglass strands, basalt strands, and combinations thereof. Methods for commercially manufacturing three-dimensional mesh components are known, and commercial three-dimensional mesh components are widely distributed. As a non-limiting example, Low & Bonar is a business entity that distributes a number of products that are "3-D polymer mats having an open structure" that can be employed in any of the embodiments as mesh component 18.

In embodiments, mesh component 18 can have a thickness of at least three millimeters, wherein the thickness is defined as the greatest normal distance between the mesh-component first side and second opposing side. In other embodiments, the thickness is at least 2 millimeters. In still other embodiments, the thickness is at least 4 millimeters.

And as also shown in FIGS. 5-8, substantially planar component 181 can be a non-woven mat that is substantially planar. Non-woven mats that are substantially planar are commercially available and any known non-woven mat can be used. As a non-limiting example, Low & Bonar is a business entity that distributes a number of non-woven mat products. Low & Bonar also distributes a number of composite products that are "3-D polymer mats having an open structure that are mechanically attached to a non-woven mat"; FIGS. 5-8 show these composite products. These Low & Bonar composite products can be employed in any of the embodiments as mesh component 18 that is attached to substantially planar component 181.

In other embodiments, substantially planar component 181 can be a woven mat, a polymeric sheet, or a polymeric film of any kind. Woven mats, polymer sheets, and polymeric films of all kinds are commercially available and can be useful.

Useful adhesive-layer-component materials for adhesive-layer components 17, 13, and 11 include polyvinylchloride (PVC) adhesives, polyolefin adhesives, polyurethane adhesives, commercially known adhesives, and combinations thereof. Applying adhesives to substrates during manufacturing processes is well known, and persons of ordinary skill in the art will be able to select useful manufacturing methods for applying adhesives to substrates without having to exercise undue experimentation.

In an embodiment, interior-sheet-component manufacturing materials provide waterproofing properties and salt-and-corrosion resistance to the overall composite structure 1. Useful interior-sheet-component materials include PVC, PVC alloys, polypropylene, polypropylene alloys, polyolefin, polyolefin alloys, and other known polymers and polymer alloys.

Useful reinforcing-component manufacturing materials include broad woven fabrics, polyester fabrics, and other known fabrics. In embodiments, reinforcing component 12 provides puncture resistance and dimensional stability.

Exterior-sheet component 16 can be any known waterproofing material. In an embodiment it is PVC or a PVC-containing film or sheet. In other embodiments, exterior-sheet component 16 is a polymeric film or sheet. In embodiments, exterior-sheet-component manufacturing materials provide waterproofing-properties, salt-and-corrosion resistance, color, pattern, barnacle resistance, graffiti resistance, and combinations thereof to the overall composite structures 1 and 1A. Useful exterior-sheet-component materials include PVC, PVC alloys, polyvinylfluoride (PVF), polyvinylidene fluoride (PVDF), polypropylene, polypropylene alloys, polyolefin, polyolefin alloys, other known polymers, polymer alloys, and combinations thereof.

Manufacturing

As mentioned above, embodiments are directed to both pre-cast or cast-in-place solid-phase composite structures. In all pre-cast and cast-in-place solid-phase composite-structure embodiments, solid-phase composite structures are manufactured using a step in which a liquid-phase or non-solid-phase base-substrate component is applied to or contacted with mesh component 18. By contacting a liquid-phase base-substrate component with mesh component 18, at least a portion of the plurality of strands that make up mesh component 18 penetrate into the liquid phase or non-solid phase and remain there during the phase change or curing of the liquid phase into a solid phase. At the time of phase change, i.e., from liquid to solid or from non-solid to solid, the plurality of strands previously penetrated therein become mechanically attached to the solid phase from under the surface of the solid phase where the strands are embedded therein and thereby mechanically attached to the solid-phase fixed matrix. In embodiments, the liquid-phase base-substrate material is poured onto at least a portion of mesh component 18; as a non-limiting example, this is done by pouring liquid-phase base-substrate material into a mold wherein the interior cavity of the mold is defined by a plurality of strands that make up mesh component 18. In other embodiments, mesh component 18 is applied to or rolled onto the top surface of the liquid-phase base-substrate material and then allowed to rest upon the liquid-phase surface as the strands of mesh component 18 penetrate into and beneath the surface of the liquid-phase base-substrate top surface; and as in the above embodiment, the strands of mesh component 18 remain there during the phase change or curing of the liquid phase into a solid phase. At the time of phase change, i.e., from liquid to solid, the plurality of strands become mechanically attached to the solid-phase fixed matrix from under the surface of the solid phase where the strands are embedded in and thereby mechanically attached to the solid-phase fixed matrix.

Known manufacturing methods and procedures can be used to manufacture solid-phase composite structures, and in embodiments, solid-phase composite structures are manufactured in steps. As a non-limiting example for manufacturing solid-phase composite structure 1, in a first step, mesh component 18 is attached to solid-phase base-substrate component 20, and then in a second step, exterior-sheet component 16 is subsequently extruded onto substantially planar component 181 that is attached to mesh component 18. In an additional manufacturing embodiment, the above-mentioned first and second steps are reversed, i.e., exterior-sheet component 16 is first extruded onto substantially planar component 181, and then mesh component 18 is attached to solid-phase base-substrate component 20.

In a similar fashion to the method described immediately above regarding manufacturing solid-phase composite structure 1, manufacturing solid-phase composite structure 1A can employ steps that attach the components to one another in any reasonable sequence or manner, and persons of ordinary skill in the art will be able to determine useful manufacturing method sequences without having to exercise undue experimentation. As a non-limiting example, in a first manufacturing step directed to manufacturing solid-phase composite structure 1A, mesh component 18 is attached to solid-phase base substrate 20; in a second manufacturing step, adhesive component 17 is then adhered or attached to substantially planar component 181; and in a third manufacturing step, exterior-sheet component 16 is subsequently adhered to adhesive component 17, thereby completing manufacture of the four-component solid-phase composite structure 1A.

Known manufacturing methods can be used to manufacture solid-phase composite structure 2, and in embodiments, solid-phase composite structure 2 is manufactured in steps. As a non-limiting example for manufacturing solid-phase composite structure 1, the three-layer laminate portion, e.g., the PVC or PVC alloy 10/polyester woven fabric 12/PVC or PVC alloy 14 laminate portion, is manufactured in a first step(s), then adhesive-layer component 17 is applied to interior-sheet component 14 followed by substantially planar component 181 being applied to adhesive-layer component 17, and if substantially planar component 181 is attached to mesh component 18, then finally contacting mesh component 18 of this intermediate membrane structure with a liquid-phase base-substrate component and allowing the liquid-phase base substrate component to change phases into a solid—thereby creating solid-phase composite structure 2.

Known manufacturing methods can be used to manufacture the portion of solid-phase composite structure 2 that is a three-component laminate, wherein the three-component laminate is reinforcing component 12 having polymeric films or sheets 16 and 14 on either side. As a non-limiting example, known manufacturing methods allow for extruding a polymeric film or sheet such as PVC or a PVC alloy on a first side of a polyester woven fabric followed by extruding a PVC or a PVC alloy film or sheet on the second side of the polyester woven fabric. In an additional non-limiting example, known methods allow for co-extruding PVC or a PVC alloy films or sheets on both sides of a polyester woven fabric, thereby creating a three-component laminate that is a PVC or PVC alloy 16/polyester woven fabric 12/PVC or PVC alloy 14. In embodiments the extruded PVC or PVC alloy films or sheets 16 and 14 are at least partially embedded into polyester woven fabric 12 thereby fixing the three laminate components into place.

In still another non-limiting example shown in FIG. 4, i.e., structure 2A, and in place of extruding or coextruding sheets 16 and 14 onto reinforcing component 12 as described above, sheets 16 and 14 can be adhered to reinforcing component 12 using adhesive-layer components 11 and 13. Known manufacturing methods can be used to apply adhesive to substrates including reinforcing component 12, sheet 16, and sheet 14. Persons of ordinary skill in the art can determine useful adhesive amounts and thicknesses without having to exercise undue experimentation. Methods for applying an adhesive to a substrate are well known.

Known methods can be used to apply adhesive-layer component 17 to both interior-sheet component 14 and substantially planar component 181. Persons of ordinary skill in the art can determine useful amounts and thicknesses of adhesive without having to exercise undue experimentation. Methods for applying an adhesive to a substrate are well known.

In an embodiment, the three-component laminate, e.g., a three-component laminate membrane that is a PVC or PVC alloy 16/polyester fabric 12/PVC or PVC alloy 14, can be used to provide any, all, or combinations of the following properties to solid-phase composite structure 1: waterproofing, color, pattern and texture, corrosion resistance, salt resistance, anti-barnacle properties, and graffiti resistance.

In embodiments, solid-phase concrete composite structures 1, 1A, 2, and 2A have improved tensile properties relative to concrete structures without surface elements attached thereto.

What is claimed is:

1. A composite structure comprising:
 a solid-phase base-substrate component;
 a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component;
 a substantially planar component having first and second sides, wherein the substantially planar-component first side is attached to the mesh-component second side; and
 an adhesive-layer component having a first and second surface, wherein the adhesive-layer component first surface is in contact with and attached to the second side of the substantially planar component, and wherein the adhesive-layer second surface is in contact with and attached to a first surface of an exterior sheet.

2. The composite structure of claim 1, wherein the substantially planar component is a non-woven mat.

3. The composite structure of claim 1, wherein the substantially planar component is a polymeric film.

4. A composite structure comprising:
 a solid-phase base-substrate component;
 a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component;
 a substantially planar component having first and second sides, wherein the substantially planar-component first side is attached to the mesh-component second side; and
 an exterior sheet that is attached to the second side of the substantially planar component.

5. The composite structure of claim 4, wherein the substantially planar component is a non-woven mat.

6. The composite structure of claim 4, wherein the substantially planar component is a polymeric film.

7. A composite structure comprising:
 a solid-phase base-substrate component;
 a mesh component having non-woven solid-phase polymeric strands that are fused together to form a three-dimensional structure having a thickness of at least three millimeters, the thickness being defined as the greatest normal distance between the mesh-component first side and second opposing side, at least a portion of the polymeric strands that make up the mesh-component first side are embedded into and thereby attached to the solid-phase base-substrate component;
 a substantially planar component having first and second sides, wherein the substantially planar-component first side is attached to the mesh-component second side;
 an adhesive-layer component having a first and second surface, wherein the adhesive-layer component first surface is in contact with and attached to the second side of the substantially planar component, and wherein the adhesive-layer second surface is in contact with and attached to a first surface of an interior sheet; and
 a reinforcing component having a first and second surface wherein the reinforcing component first surface is in contact with and attached to a second surface of the interior sheet, and wherein the reinforcing component second surface is in contact with and attached to a first surface of an exterior sheet.

8. The composite structure of claim 7, wherein the substantially planar component is a non-woven mat.

9. The composite structure of claim 7, wherein the substantially planar component is a polymeric film.

10. The composite structure of claim 7, wherein the interior sheet and exterior sheet are manufactured from the same material.

11. The composite structure of claim 7, wherein the interior sheet and exterior sheet are manufactured from different kinds of materials.

12. The composite structure of claim 7, wherein the reinforcing component is a fabric.

* * * * *

UNITED STATES PATENT AND TRADEMARK OFFICE
CERTIFICATE OF CORRECTION

PATENT NO.         : 10,967,614 B2
APPLICATION NO.    : 15/956842
DATED              : April 6, 2021
INVENTOR(S)        : Frank E. Bradenburg Page 1 of 1

It is certified that error appears in the above-identified patent and that said Letters Patent is hereby corrected as shown below:

On the Title Page

Item (73), Assignee, should read: SEAMAN CORPORATION, Wooster, OH (US)

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*